Jan. 6, 1931.  P. E. BRENEMAN  1,787,718
BODY CONSTRUCTION
Filed Sept. 4, 1926  3 Sheets-Sheet 1
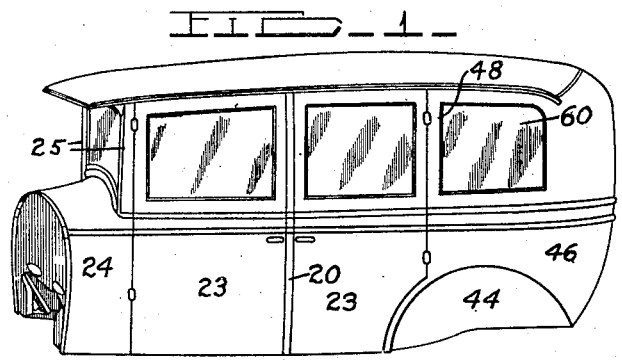
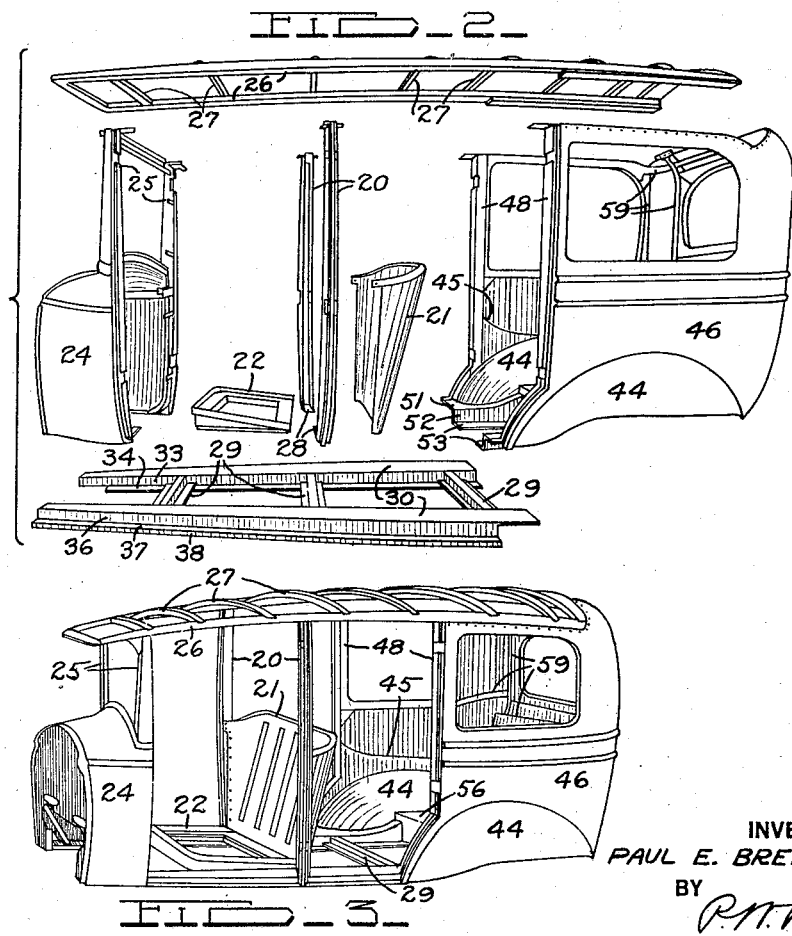
INVENTOR
PAUL E. BRENEMAN
BY
ATTORNEY

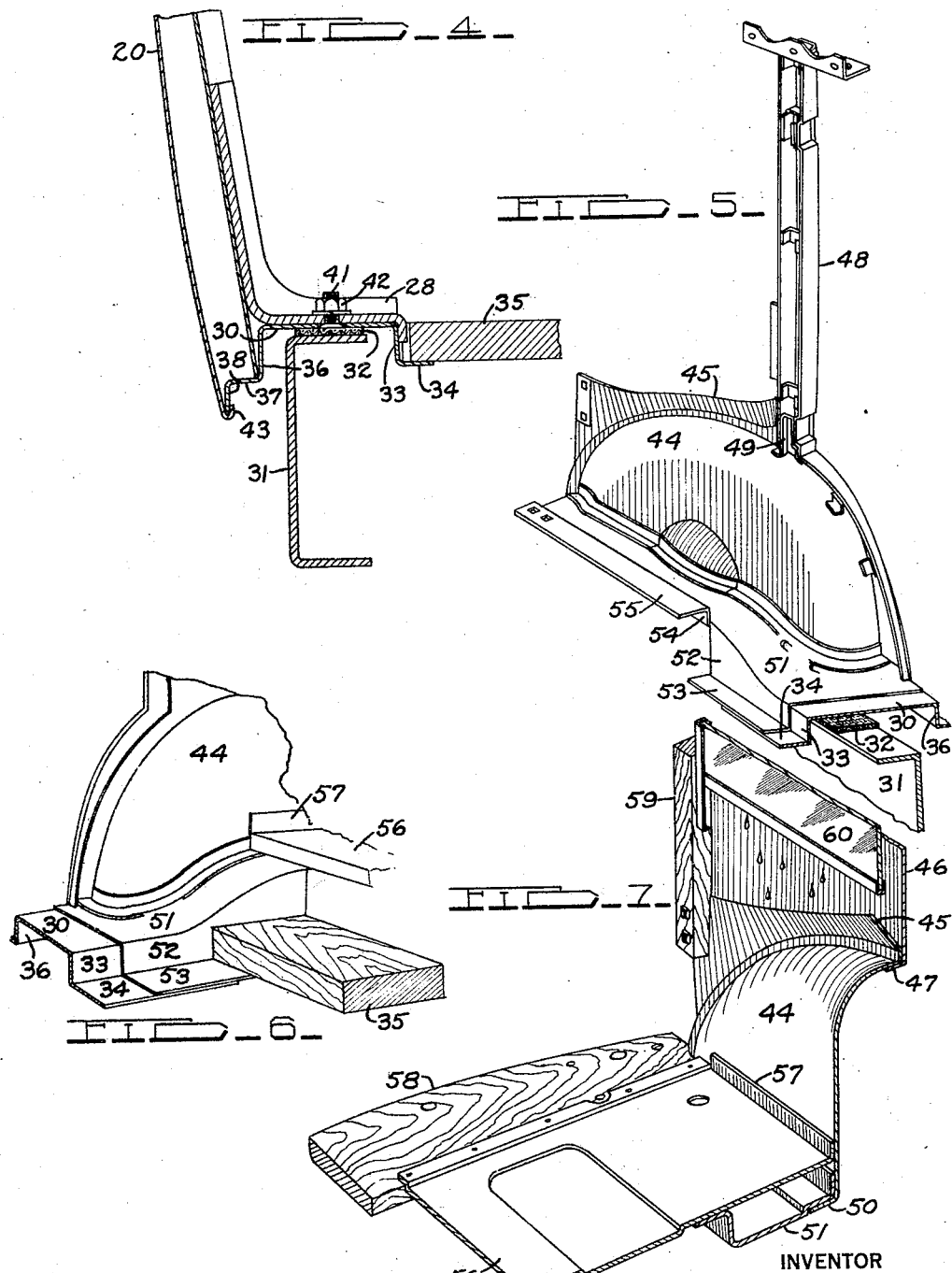

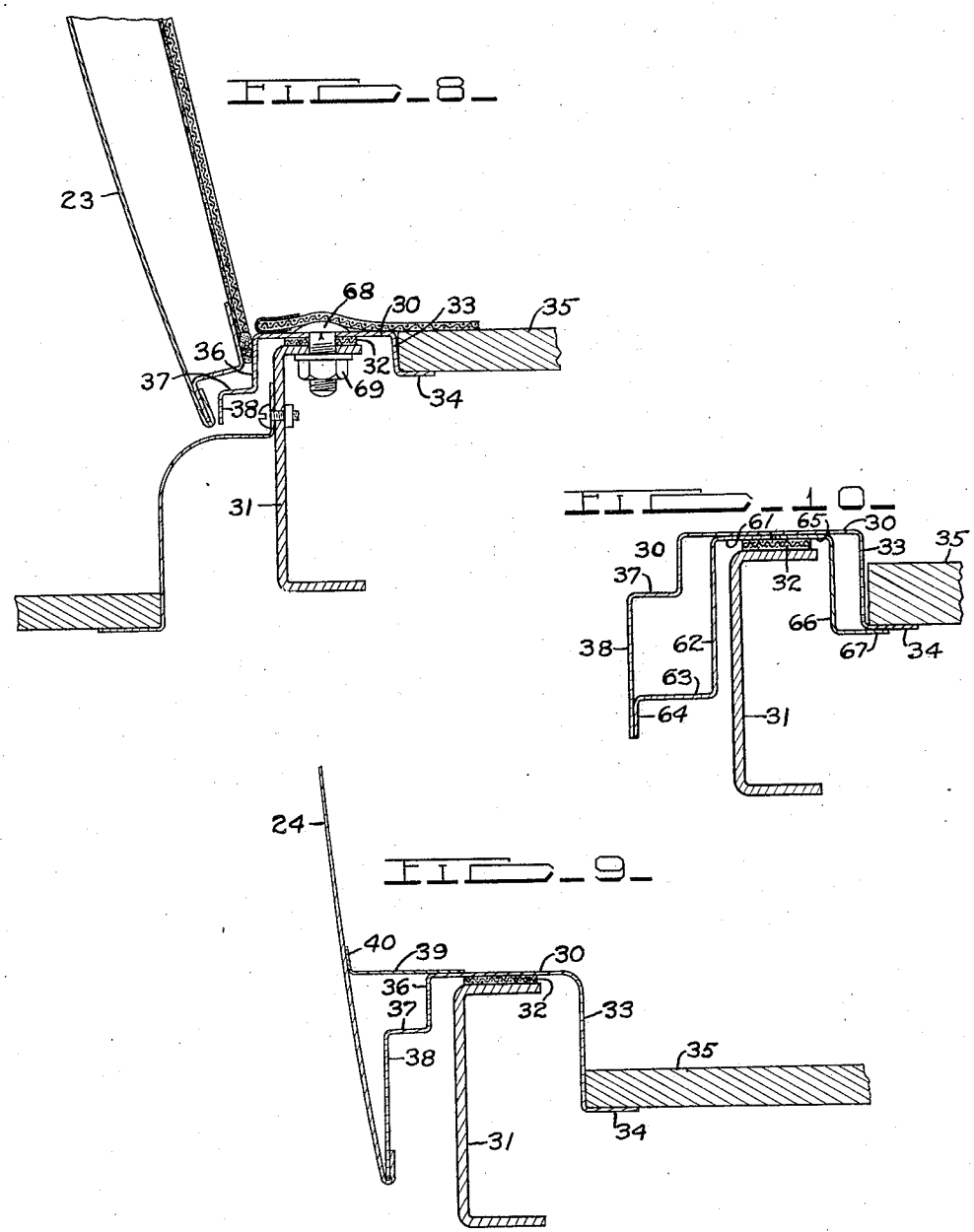

Patented Jan. 6, 1931

1,787,718

UNITED STATES PATENT OFFICE

PAUL E. BRENEMAN, OF DETROIT, MICHIGAN, ASSIGNOR TO THE STUDEBAKER CORPORATION, OF SOUTH BEND, INDIANA, A CORPORATION OF NEW JERSEY

BODY CONSTRUCTION

Application filed September 4, 1926. Serial No. 133,626.

This invention relates to constructions for automobile bodies and deals particularly with sill constructions therefor, the main object being to provide a new and novel sill construction which will permit the building of lower bodies and which, at the same time, will be strong and economical to build.

Another object is to provide a sill for an automobile body which is made from sheet metal and formed to a shape that permits the maximum lowering of the body of which it forms a part.

Another object is to provide a sill construction for an automobile body formed from sheet metal into an inverted U-shaped section.

Another object is to provide an automobile body frame formed into a generally inverted U-shaped section, the frame side rails of the chassis frame upon which the body is to be mounted being adapted to be received within the U of the sills, thereby allowing the body to assume a relatively low position in respect to the chassis frame.

Another object is to provide a sill construction for an automobile body in which each sill is composed, for the most part, of a single thickness of sheet metal bent into an inverted U-shaped section within which the chassis frame rails are adapted to be received, the inner edges of the sills being turned inwardly to form a supporting flange for the floor board of the automobile body.

Another object is to provide a sill construction for an automobile body in which the sill is formed from sheet metal to an inverted U-shaped section within which the chassis frame side rails are adapted to be received, the inner marginal edges of the sills being turned inwardly at a point substantially below the point where the upper edge of the chassis frame is adapted to normally rest, for supporting the floor boards, whereby the upper surface of the floor boards may be positioned below the upper edge of the chassis frame when the body is mounted on such frame.

Another object is to provide a sheet metal sill for an automobile body in which the sill is formed to a generally inverted U-shaped section, the outer edge of the sill being stepped to provide a rabbeted surface complementary to the bottom edges of the doors used in conjunction with said body.

Another object is to provide an automobile body adapted to be built up in independent units and then joined together, one of said units comprising a sill unit the side members of which are formed from sheet metal into a generally inverted U-shaped section.

A further object is to provide an automobile body adapted to be built up in independent units of major size and importance which are then joined together, one of said units comprising a sill unit provided with side rails of sheet metal formed to an inverted U-shaped section within which the chassis frame side rails are adapted to be received, and another unit of which comprises a body rear section the lower edges of which are formed to effect a continuation of the sill unit when connected thereto.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views.

Figure 1 is a perspective view of an automobile body of a type to which the present invention is readily adaptable.

Figure 2 is a perspective view showing the different major units which may be built up into substantially completed condition before assembly to form a complete body as shown in Figure 1, and which method of building a body is particularly suited for the utilization of the present invention.

Figure 3 is a perspective view showing the different units of Figure 2 assembled together.

Figure 4 is a fragmentary sectional view taken transversely of the body and centrally of one of the center pillars, showing the method of securing the latter to the sill and illustrating the position of the chassis frame side member in relation thereto.

Figure 5 is a perspective view of the body wheel-house assembly which forms a part of the body rear section unit, showing the formation of the lower part thereof to effect a continuation of the body sills, a portion of a chassis frame side rail being shown in normal operative position in respect thereto.

Figure 6 is a fragmentary perspective view of one of the forward lower corners of the body rear section unit in substantially completed condition, showing one of the sill side members secured thereto and illustrating the manner in which the floor boards are supported.

Figure 7 is a fragmentary sectional view taken transversely through the body just rearwardly of the center of the wheel-house, showing the manner of supporting the rear seat pan and illustrating the manner in which the latter is employed to form a box section for the sill at this point.

Figure 8 is a fragmentary sectional view taken transversely of the body through one of the doors, showing the relation of the doors in respect to the sill, the manner of securing the sills to the chassis frame, and a method of using a running board splash guard when such is employed.

Figure 9 is a fragmentary sectional view taken transversely of the body through one of the body panels, showing a preferable method of securing the panels thereto, and in this case, showing a modification of the sill construction in which the body may be placed still lower on the chassis frame with the upper surface of the floor boards below the normal upper surface of the chassis frame side rails.

Figure 10 is a sectional view taken through another modified form of sill and its co-operating chassis frame side rail, showing how the same may be constructed where a stiffer construction is desired than is capable of being obtained with the form shown in the previous views, without materially affecting the dimensions which effect the main advantages of the present invention.

The present trend in automobile body design is toward lower bodies, and in doing this the chassis itself has been lowered as much as is practical without creating an unwarranted expensive construction. A great deal of attention has also been paid to the bodies, but with the limitations of necessary head room and comfortable sitting posture for the passengers this has presented many difficulties. Heretofore in all the attempts, of which I am aware, which have been made to obtain a lower body, the conventional form of sill, whether it be of wood or metal, has been used. With the use of the conventional wooden or hollow sheet metal sill, the position of the floor of the body, which necessarily limits the height of the body thereabove, has of necessity been kept on the level of the sills, and must accordingly be positioned above the vehicle chassis side frame members an amount equal to the thickness of the sills. The present invention overcomes this last-mentioned difficulty by providing a sill fabricated from sheet metal and of such a construction that only a single thickness of sheet metal may be used over the chassis frame side rails, and of a construction that readily allows the upper surface of the floor boards to be positioned considerably lower than the upper surface of the chassis frame side rails if desired, this latter feature allowing the body to be considerably lowered in appearance while still retaining the requisite head room within the body.

In order to illustrate the present invention, I have shown it in the accompanying drawings, as embodied in a body as shown in Figure 1, which is made up by first producing the major portions thereof as separate units as indicated in Figure 2, each substantially complete in itself and which are afterwards secured together as in Figure 3 and then finally finished and trimmed to bring the body to the finished condition indicated in Figure 1. These units, as shown in Figure 2, comprise a cowl unit, a rear section unit, a roof-frame unit, a sill unit, and, where the type of body requires the following, pillars 20, a front seat back 21, front seat frame 22, and the conventional doors 23 which are shown only in Figure 1.

It is quite desirable to secure the seat back 21, frame 22 and pillars 20 together to form a larger unit before assembly and this may be accomplished easily without any explanation. In utilizing the present invention in this manner of building a body, I prefer to build that part of the sill which extends under the rear section unit as an integral part of that unit and to stop the rear end of the sill unit at the forward end of the rear section unit to which it may be readily secured, as the sheet metal work for the rear section unit, in this case, readily lends itself to being formed in this manner and effects a saving in weight and material, although it is to be understood that the present invention is not limited to this short sill construction but the sills may be readily extended the full length of the body as in the conventional constructions and the body constructed thereupon in any convenient manner such as is generally in use.

The cowl unit comprises a cowl panel 24, pillars 25 and various smaller parts such as toe board rests, instrument board supporting brackets and the like, all integrally joined together separately from the sills and provided with suitable flanges for securing the same to the sills. The roof-frame unit comprises side rails 26 and cross bows 27, suitable flanges being provided at the top of the other units for securing the same thereto. The pillars 20 are provided with flanges 28 adjacent their lower end and are secured to the sills in the manner illustrated in Figure 4.

The sill unit comprises side bars or sill members proper secured together in properly spaced relationship by cross bars 29, which may be of any desired design, but as shown are formed of sheet metal into an inverted U-shaped section with the free ends of the U being bent outwardly to provide attaching flanges. The sill side bars shown in Figures 1 to 9, inclusive, are formed of sheet metal into a generally inverted U-shaped section, more specifically to provide, among other things, a horizontal portion 30 which is adapted to rest on the top surface of the chassis frame side rail 31, a strip of fabric or other flexible material such as 32 preventing direct contact between these two surfaces to prevent squeaking. The horizontal portion 30 preferably extends out over both edges of the rail 31, its outer edge simulating the contour of the lower edge of the finished body and the inner edge following the shape of the inner edge of the rail 31. The metal at the inner edge of the portion 30 is bent downwardly to provide a vertical portion 33 and then horizontally inward to provide a supporting flange 34 for the floor boards 35, which are adapted to rest thereon. In Figures 1 to 8, inclusive, the vertical portion 33 is of substantially the same depth as the thickness of the floor boards 35, so that the surface of the floor boards is flush with the surface of the horizontal portion 30. Modifications of this feature are shown in Figures 9 and 10 and will be discussed later. The metal at the outer edge of the horizontal portion 30 is also bent downwardly to form a vertical portion 36, which in turn is bent outwardly as at 37 and then downwardly as at 38. This gives the outer edge of the sill a stepped effect which particularly lends itself to matching the rabbeted lower edge of the doors 23, as is illustrated in Figure 8, as well as imparting a rigidity to the construction.

In Figure 9 the inner vertical portion 33 has been extended down lower than shown in the previous views to illustrate what may be done with this construction to lower the floor boards to a point substantially below the upper surface of the chassis frame side rail, thus lowering the floor of the body and allowing the body as a whole to be positioned closer to the ground. In the same figure the outer lower vertical portion 38 has also been extended down further than shown in the previous views to show how a lower appearance of the body may be effected.

The cowl unit is secured to the sills by bending the lower edges of the cowl panel back up under the lower edge of the lower vertical portion 38 and preferably welding it thereto, and by securing the various flanges to the horizontal portion 30 of the sill by screws, rivets or other suitable means. The manner of securing the cowl panel to the sill in the above described manner is clearly shown in Figure 9, in which is also shown a plate 39 having an upwardly flanged outer edge 40, the plate being secured to the upper face 30 of the sill and the flange 40 being secured to the panel 24, this serving as additional securing means and also to cover the space between the sill and panel 24 which would otherwise be left open.

The center pillars 20 are secured to the sills by bolting the lower inturned flange 28 to the upper face 30 by bolts such as 41 and nuts such as 42, the lower end of the pillar projecting down below the flange 28 and fitting into the rabbeted outer sill edge and being provided with a projecting end portion 43 (see Figure 4), which is bent under the lower edge of the vertical sill portion 38 in the same manner that the lower edge of the cowl panel 24 is secured thereto.

Should the sills proper be extended the full length of the body as in most conventional constructions, the rear section unit would be secured thereto in a manner similar to that in which the front section and side pillars 20 are secured thereto, as just described. Inasmuch as in the particular embodiment described the sills proper are joined only to the front edge of the rear section unit, and the unit itself is formed to supply an extension therefor, a more complete description of this part will be necessary. The rear section unit shown is itself built up in stages, first, two wheel-house sections, one of which is shown in Figure 5, which are afterward connected together by a seat pan and cross bar as shown in Figure 7, provided with suitable framework for the body rear panel and then paneled to bring it to the condition shown in Figure 2, in which condition it is ready to be assembled to the other units.

The wheel-house section comprises a sheet metal stamping 44 formed to the finished shape of the wheel-house, its upper edge being bent vertically a short distance and then extended upwardly and inwardly as at 45 to form a trough between it and the rear panel 46, which is secured thereto by a marginal flange 47 fitting under the horizontally extending outer edge as shown in Figure 7, to catch and carry away rain that might enter the rear windows and drop down off of the lower edge of the windows 60 as indicated in Figure 7. The rear pillars 48 for the rear doors 23 are secured to the wheel-house 44 by suitable flanges such as 49. The lower edge of the wheel-house 44 is bent inwardly to form a marginal flange 50 which conforms in a vertical plane to the shape of the chassis frame side rail 31, which curves inwardly at this point to form the conventional frame "kick-up" in order to provide clearance for the movement of the rear axle therebelow. To this flange 50 is secured the outer edge of an inwardly extending plate member 51 which, in effect, serves as an extension of the sills as previously described, its main body portion conforming in a vertical plane to the shape of the rail 31 the same as the flange 50, and extending inwardly to a point inside of the rail 31 where the forward portion of its inner edge is bent downwardly as at 52 and then inwardly as at 53 to match the downwardly and inwardly extending portions 33 and 34 of the sills. These portions 52 and 53 extend back to a point where the pan for the rear seat begins, and from that point rearwardly the inner edge of the plate 51 is bent upwardly as at 54 and then inwardly to form the flange 55 which supports the seat pan 56. The seat pan 56, which extends between the wheel-house stampings 44, extends over the flange 55, to which it is secured, to the wheel-house stamping 44 to which it is secured by its marginal flange 57, thus forming a box section under it at this point which lends rigidity and strength to the construction. A wooden rear cross bar 58 is preferably secured between the rear ends of the plate member 51 to provide a rigid support for the rear end of the seat pan 56 and to provide means for securing the lower edge of the rear portion of the rear panel 46 in place. Suitable frame work 59, of wood as shown, or of steel stampings if desired, is then secured to the unit thus far completed and then the rear panel 46 is applied and secured thereto. The rear section unit is then in the condition shown in Figure 2 and is ready to be assembled to the sill section. This operation is easily accomplished by simply nesting the rear ends of the sills within the forward ends of the plate members 51 and securing them thereto by welding, riveting or otherwise.

Should it be desired to obtain greater rigidity of the sill for a given thickness of metal than is possible in the sills above described, a simple addition to that form may be made as indicated in Figure 10 by the addition of one or more other stampings. In Figure 10 two Z-shaped stampings are shown added to the previously described sill section to form box sections lying on each side of the chassis frame side rails 31. Although this addition has been shown as being in two separate parts, it will be readily apparent that it may be made from a single piece where such construction is found feasible. The outer part comprises a horizontal portion 61, which is secured to the under surface of the horizontal portion 30 of the sill and extends from approximately its midpoint to a point just outside of the chassis frame side rail 31, at which point it is bent downwardly as at 62 to a point below the outer horizontal face 37 of the sill and then outwardly as at 63 to the lower vertical portion 38 of the sill to which it is secured by a marginal flange 64. This results in a box section which adds considerable stiffness to the sill.

The inner part is also provided with a horizontal portion 65 secured to the under face of the horizontal portion 30 of the sill and extends from the inner edge of the portion 61 to a point just inside the chassis frame side rail 31 where it bends downwardly as at 66 to a point in line with the floor board supporting flange 34, at which point it is bent inwardly as at 67 and secured to the flange 34. This gives a second box section portion which imparts still more stiffness to the sill and results in a very rigid construction which increases the sill above the rail 31 by only a single thickness of the sheet metal.

When a body built with sills such as described is mounted on its chassis frame, the sills are guided over the chassis frame side rails 31 and lowered down thereon with the rails 31 received within the sill, the horizontal portion 30 of the sill resting against the upper surface of the rail 31 with the interposition of the strip of fabric 32 for preventing squeaking as previously explained. The body may then be secured to the rails 31 by bolts such as 68 and nuts 69 as indicated in Figure 8.

Having described the present invention it will be readily apparent that a construction has been disclosed which materially aids in the lowering of a vehicle body on its chassis frame, and at the same time it provides a construction that is simple and economical to manufacture and is considerably lighter than the conventional form of heavy wood or sheet metal sill construction now generally in use.

Formal changes may be made in the specific embodiment of the invention described without departing from the spirit or substance of the broad invention, the scope of which is commensurate with the appended claims.

What I claim is:

1. A sill for a vehicle body comprising a pair of Z-shaped stampings positioned in opposed relationship to form an inverted U-shaped section, and an inverted member of substantially U-shaped section secured at its side edges to the sides of said Z-shaped stampings, said Z-shaped stampings being positioned within said inverted member and the upper horizontal surfaces of said Z-shaped stampings being in supporting contact with the horizontal surface of said inverted member.

2. A sill for a vehicle body comprising a sheet metal stamping of inverted substantially U-shaped section, and a sheet metal member of inverted substantially U-shaped section positioned within said stamping within which a chassis frame side rail is adapted to be received, the corresponding marginal side edges of said stamping and member being spaced from each other and bent to substantially a horizontal plane to provide a floor board support and the horizontal surface of said member being in supporting contact with the horizontal surface of said stamping.

3. A sill for a vehicle body comprising a sheet metal member of inverted substantially U-shaped section, and a second sheet metal member of inverted substantially U-shaped section positioned within said first member and secured thereto at its side edges, the vertical portions of said second member being spaced from the vertical portions of said first member and the horizontal surface of said second member being in supporting contact with the horizontal surface of said first member.

4. A sill for a vehicle body comprising a sheet metal member of inverted substantially U-shaped section, and a second sheet metal member of inverted substantially U-shaped section positioned within said first member and secured thereto along their central horizontal surfaces, the vertical sides of said second member being spaced from the sides of said first member for substantially their full length, and the free edges of said second member being secured to said first member.

5. A sill for a vehicle body comprising a sheet metal member of inverted substantially U-shaped section, and a second sheet metal member of inverted substantially U-shaped section positioned within the first mentioned member with its horizontal surface in supporting engagement with the horizontal surface of said first mentioned member, the vertical sides of said second member being spaced from the vertical sides of said first mentioned member and the free edges of said second member being secured to said first mentioned member.

6. A sill for a vehicle body comprising a sheet metal stamping of inverted substantially U-shaped section, a substantially Z-shaped sheet metal stamping positioned within the first mentioned stamping, the top horizontal surface of the Z-shaped stamping being in supporting engagement with the horizontal surface of said first mentioned stamping and the vertical portion of said Z-shaped stamping being spaced from the vertical sides of the first mentioned stamping, and means for securing the lower horizontal surface of said Z-shaped stamping to one of the vertical sides of said first mentioned stamping.

7. A sill for a vehicle body comprising a sheet metal member of inverted substantially U-shaped section having a flange directed outwardly from the lower end of a vertical side thereof to provide a floor board support, and a substantially Z-shaped member positioned within said inverted U-shaped member, the top horizontal surface of said Z-shaped member being in supporting engagement with the horizontal surface of said U-shaped member, the vertical portion of said Z-shaped member being spaced from said vertical side of the U-shaped member, and the lower horizontal surface of said Z-shaped member being secured to the underside of said flange.

Signed by me at Detroit, Michigan, U. S. A., this 30 day of August, 1926.

PAUL E. BRENEMAN.